US012805493B2

(12) United States Patent

Rodriguez Marquez

(10) Patent No.: US 12,805,493 B2
(45) Date of Patent: Nov. 24, 2026

(54) AQUAPONIC SYSTEM SET APPLYING FILTRATION WITH REVERSE OSMOSIS MEMBRANE

(71) Applicant: Edgar Antonio Rodriguez Marquez, Buenos Aires (AR)

(72) Inventor: Edgar Antonio Rodriguez Marquez, Buenos Aires (AR)

( * ) Notice: Subject to any disclaimer, the term of this patent is extended or adjusted under 35 U.S.C. 154(b) by 335 days.

(21) Appl. No.: 18/645,494

(22) Filed: Apr. 25, 2024

(65) Prior Publication Data

US 2025/0049004 A1 Feb. 13, 2025

(51) Int. Cl.

| | |
|---|---|
| ***A01K 63/04*** | (2006.01) |
| ***A01G 31/02*** | (2006.01) |
| ***A01K 61/10*** | (2017.01) |
| ***A01K 63/00*** | (2017.01) |
| ***B01D 61/58*** | (2006.01) |
| ***C02F 1/44*** | (2023.01) |
| ***C02F 101/10*** | (2006.01) |
| ***C02F 101/16*** | (2006.01) |
| *C02F 103/20* | (2006.01) |
| *C02F 103/26* | (2006.01) |

(52) U.S. Cl.

CPC ............ *A01K 63/045* (2013.01); *A01G 31/02* (2013.01); *A01K 61/10* (2017.01); *A01K 63/006* (2013.01); *A01K 63/042* (2013.01); *C02F 1/441* (2013.01); *C02F 1/444* (2013.01); *A01G 31/065* (2025.01); *A01K 2227/40* (2013.01); *B01D 61/58* (2013.01); *B01D 2317/025* (2013.01); *B01D 2325/0283* (2022.08); *C02F 2101/105* (2013.01); *C02F 2101/163* (2013.01); *C02F 2103/20* (2013.01); *C02F 2103/26* (2013.01); *C02F 2209/02* (2013.01); *C02F 2209/06* (2013.01)

(58) Field of Classification Search

CPC ...... A01G 31/02; A01G 31/065; A01K 61/10; A01K 63/006; A01K 63/042; A01K 63/045; A01K 2227/40; B01D 61/58; B01D 2317/025; B01D 2325/0283; C02F 1/441; C02F 1/444; C02F 2101/105; C02F 2101/163; C02F 2103/20; C02F 2103/26; C02F 2209/02; C02F 2209/06

See application file for complete search history.

(56) References Cited

U.S. PATENT DOCUMENTS

2017/0127656 A1* 5/2017 Bee ........................ C12M 1/002

FOREIGN PATENT DOCUMENTS

CN 111657128 A * 9/2020 ............ A01G 31/00

OTHER PUBLICATIONS

CN111657128A—EPO Machine Translation (Year: 2026).*

* cited by examiner

*Primary Examiner* — Patrick Orme
(74) *Attorney, Agent, or Firm* — Defillo & Associates, Inc.; Evelyn A. Defillo

(57) ABSTRACT

A decoupled aquaponic system having two loop subsystems: hydroponic (Hp-loop) (2) and aquaculture (RAS) (1) interconnected by a third loop subsystem performing reverse osmosis filtration (OI) of RAS (1) recirculation water to achieve a higher nutrient quantity in the former and higher quality recycled water in the latter, with consequent energy savings due to its variable control structure and OI membrane effectiveness. Prior to entering the system containing the OI membrane, a water ultrafiltration (UF) (22) treatment is added to preserve its lifespan.

28 Claims, 7 Drawing Sheets

AQUAPONIC SYSTEM SET APPLYING FILTRATION WITH REVERSE OSMOSIS MEMBRANE

FIELD OF THE INVENTION

The present invention is related to aquaponic systems, more particularly to, the use of filtration by means of reverse osmosis in an uncoupled aquaponic system in order to increase the production efficiency.

PRIOR ART

The term aquaponics is derived from the combination of the words "aquaculture" or the production of aquatic organisms and "hydroponics," which consists of soilless plant production. It is a sustainable mixed system for the production of both plants and fish. It is a relatively young discipline that integrates both techniques into one.

Traditional aquaponic systems were organized into a single process cycle, integrating coupled systems, which allows directing nutrient-rich water from fish to plants (FIG. 1). These systems compromise the ideal conditions for the production of both fish and plants such as optimal pH, temperature, and nutrient concentration required in each of the subsystems, thus reducing efficiency and productivity. This is one of the drawbacks of these basic coupled systems.

Considering the competencies and nutritional benefits provided by aquaculture effluents for plant growth, such as nitrogen and phosphorus, and considering that both subsystems have specific requirements that are not fully compatible, there is a need to explore new proposals, including the decoupling of both systems.

Decoupled systems (FIG. 2) differ from coupled systems in that they separate water and nutrient loops from aquaculture and hydroponic units, thus providing control of water chemistry in both systems.

Despite the potential benefits, initially, the design with decoupling of two loops presented drawbacks. This is due to the high amounts of additional nutrients needed to be added to the hydroponic cycle since the processing water flowing from the RAS (Recirculating Aquaculture System) to the hydroponic circuit (Hp-loop) depends on evapotranspiration, i.e., moisture loss from a surface by direct evaporation along with water loss by vegetation transpiration. Nutrients also tended to accumulate in RAS systems when evapotranspiration reached critical levels, requiring periodic water purging.

Given the mentioned drawbacks, new proposals were devised, such as that of Goddek et al. (2019), which proposes decoupling by a multiloop system (FIG. 3) where demineralization and mineralization units of nutrients are implemented by thermal distillation according to the subsystem's requirements, allowing it to operate in continuous maintenance cycles entirely. In addition to thermal distillation, this process can be carried out by reverse osmosis (RO) membrane filtration. In the latter, two streams are generated: a) a rejection one that allows separating minerals from the water source, thus concentrating nutrients by recirculation in the hydroponic system avoiding external addition, and the other b) permeation, with fewer salts, which achieves water purification that returns to the aquaculture system.

The thermal distillation technology makes aquaponic systems even more complex when considering its implementation. This additional loop may not make sense for small producers, but it may have potential for larger commercial systems, considering always higher energy expenditure.

The technologies currently used for membrane desalination are reverse electrodialysis (EDR) and reverse osmosis (RO). The choice between the two membrane separation technologies EDR or RO will depend on which is the most suitable and cost-effective for a given application, i.e., chosen aquaculture and hydroponic species, the required energy consumption proportional to the amount of salts removed from the water source, the concentration of total dissolved solids (TDS), and the quality of the source water.

Reverse osmosis (RO) is a technology based on a semipermeable membrane that separates two solutions with different concentrations. By applying pressure higher than the osmotic pressure on the side of higher concentration, a water flow occurs from the solution with higher salinity to one with lower salinity. The term semipermeable refers to a membrane that selectively allows water to pass through it at a much higher rate than the transfer rate of any component contained in the water.

In summary, desalination by semipermeable membrane (FIG. 4) used in RO produces overall lower costs, especially energy costs, compared to other desalination technologies.

It is desirable to have membrane desalination of aquaculture recirculation effluent with the necessary design and technological supplies to achieve a decoupled aquaponic option that maintains the necessary water quality in both biotic subsystems to increase process performance.

The present invention focuses on membrane desalination by RO of aquaculture recirculation effluent. This would result in the filtered or permeate product being low in dissolved salts, thus beneficial for diluting and treating the RAS and a rejection stream as a concentration product of nitrates and phosphates rich nutrients from the RAS directed to the Hp-loop system. In this operation, the appropriate requirements in the salt balance and pH adjustment must be achieved, as well as the correct sanitary treatment to prevent biofouling by various organic contaminants on the membrane (RO).

BRIEF SUMMARY OF THE INVENTION

The present invention relates to a decoupled aquaponic system comprising: a recirculating aquaculture subsystem (RAS loop) consisting of a fish tank unit; a hydroponic subsystem (Hp-loop) consisting of a plurality of Deep Water Culture (DWC) floating raft units; and a third loop that performs reverse osmosis membrane filtration treatment connecting both subsystems. In the present decoupled aquaponic system, the fish are freshwater and the plants (vegetables, fruits, inflorescence, bulbs, stems, ornamentals, and fodder) are susceptible to be cultivated hydroponically.

DETAILED DESCRIPTION OF THE EMBODIMENTS IN THIS INVENTION

With the aim of overcoming the drawbacks of previous art, the present invention proposes treating aquaculture recirculation effluent with semipermeable reverse osmosis membranes in a decoupled aquaponic system, to achieve an increase in productivity with consequent energy savings.

In this way, the following are achieved jointly: a) greater reliability to estimate future fish and plant production, b) greater stability to maintain optimal control parameters for the entire process, c) increased productive yield of both subsystems: hydroponic and especially aquaculture, and d) considerable energy savings compared to other interconnection systems between RAS and the Hp-loop.

Figure 1:
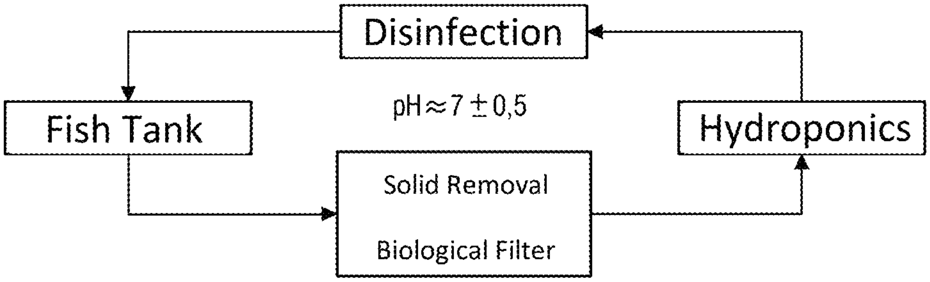
FIG. 1 shows a traditional aquaponic system coupled with a single recirculation loop.
Figure 2:
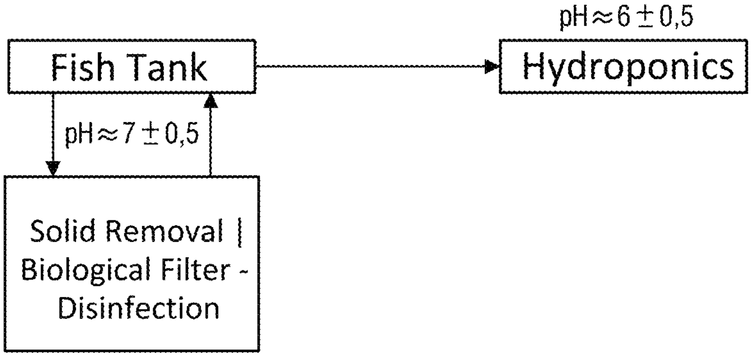
FIG. 2 shows a decoupled aquaponic system: 2 recirculation loops.
Figure 3:
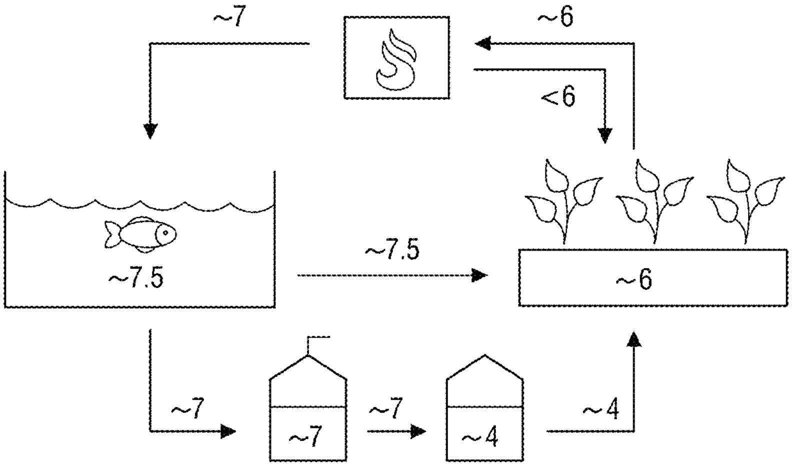
FIG. 3 shows a decoupled multi-loop aquaponics system with distillation/desalination and mineralization process by anaerobic treatment of captured solids discharge.
Figure 4:
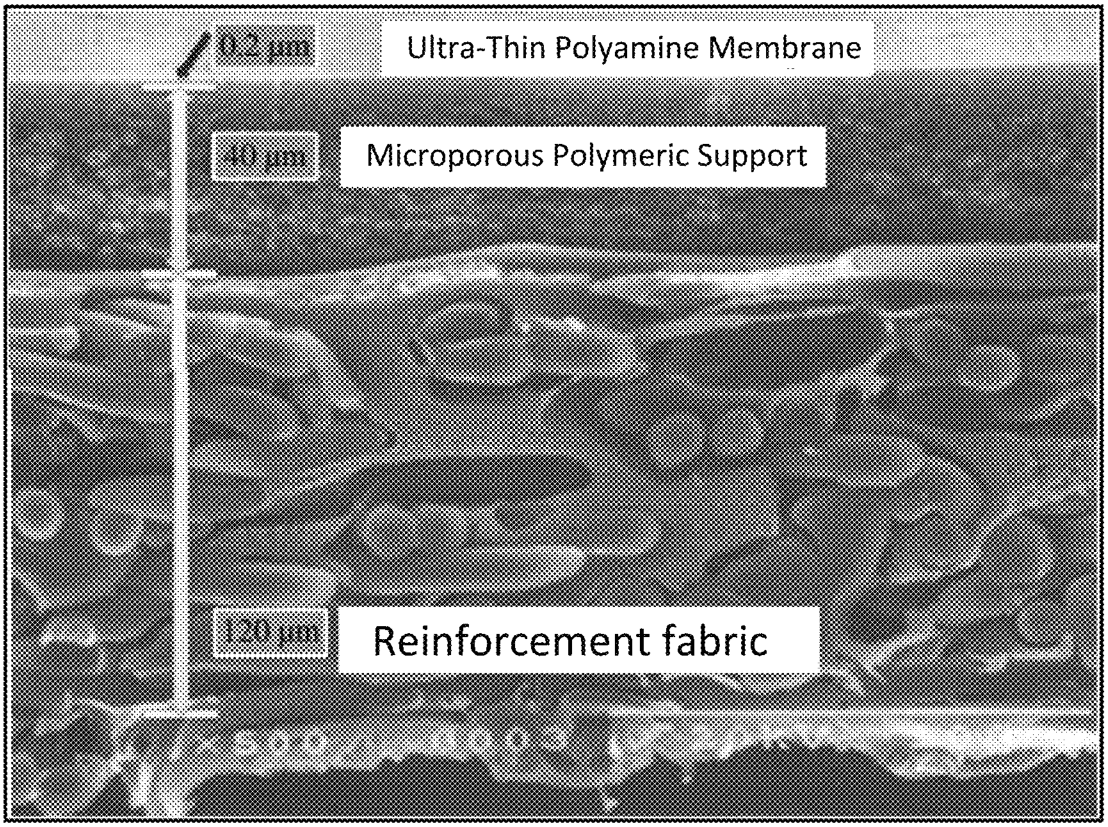
FIG. 4 shows the structure of the reverse osmosis membrane.
Figure 5:
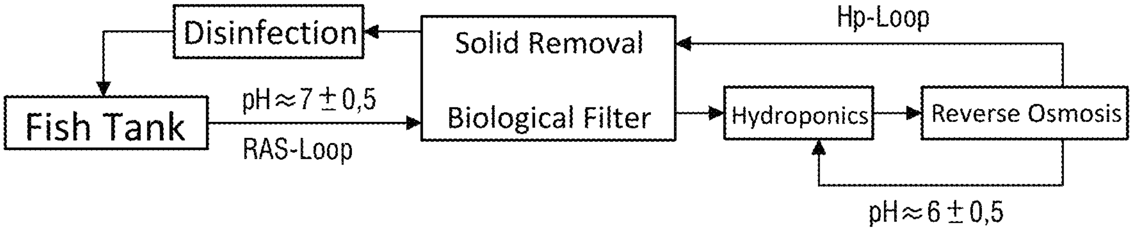
FIG. 5 shows a decoupled multi-loop system with reverse osmosis filtration treatment.

In a preferred embodiment, the equipment of the present invention consists of three recirculation loops or 3-loops, a first loop for the aquaculture recirculation system RAS (1), a second loop for the hydroponic recirculation system Hp-loop (2), and a third loop that performs the filtration treatment by reverse osmosis membrane (OI) (3) for the desalination process and that will interconnect the two previous loops: RAS (1) and Hp-loop (2) (FIG. 5).

The necessary conditions to implement the invention as mentioned above are as follows:

The chosen species are: *Oncorhynchus mykiss* sp. (rainbow trout) and *Lactuca sativa* sp. (lettuce).

Figure 6:
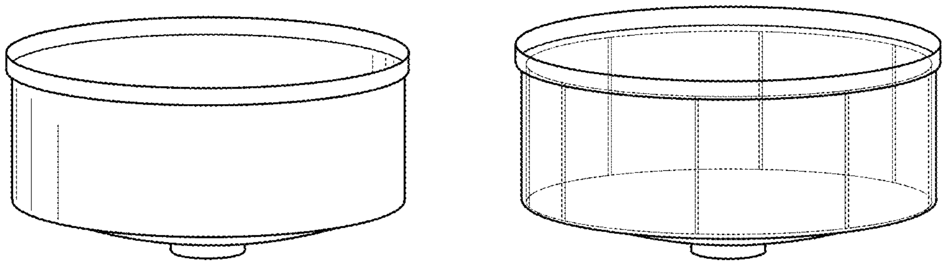
FIG. 6 shows the design of a minimum unit fish tank with a capacity of 1 $m^3$.

A single tank (4) is used for the aquaculture system with a volume of 1 $m^3$ (FIG. 6).

Figure 7:
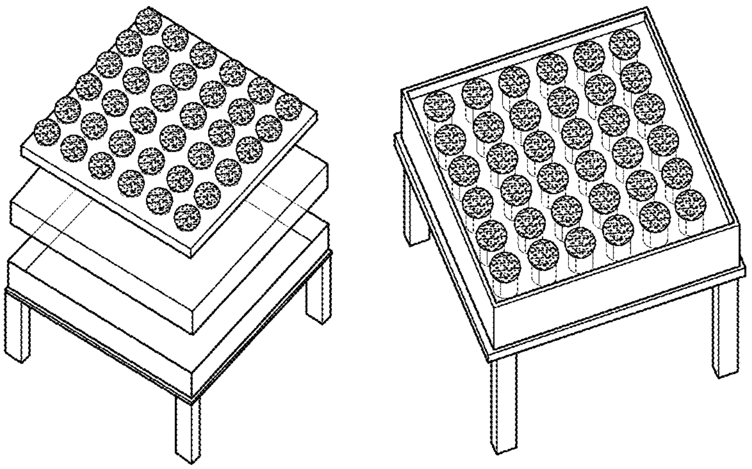
FIG. 7 shows the design of a minimum unit floating raft (DWC technology) for a crop density of 36 $m^2$.

The value of the hydroponic surface area (HSA) is approximately 0.98 $m^2$ per bed or raft (FIG. 7), and the plant density is approximately 36 plants/$m^2$, using 36 beds. The hydroponic system used is DWC (Deep Water Culture) consisting of plants suspended on floating rafts or beds, with their roots stretching downwards and submerged in an aerated water tank rich in nutrients. The aquaponic rate, which consists of the amount of food needed for the fish expressed in grams per $m^2$ of plantation per day, is defined between 16 to 75 g of feed/$m^2$ HSA·day.

The system receives tap water in a sanitary tank (5) where it undergoes pretreatment by being pumped through a sand filter and then through another activated carbon filter. This water is then incorporated into the mixing chamber (CMIX) (6) corresponding to the RAS subsystem (1) as required.

A sieve with stainless steel mesh (7) whose minimum particle retention size is 200 μm is incorporated prior to a static (primary) conical sedimentator (8), with a gravity flow system to ensure quality water for the RAS subsystem (1), and b) a physical treatment system using ultraviolet radiation (UV) (9) to inhibit the microbiological growth of pathogens and protect fish and plants from them, with a capacity of 30 mJ/$cm^2$.

An aerobic MBBR (Moved Bed Bio-Reactor) type bioreactor (10) is used for nitrification treatment by bacteria of the genera *Nitrosomonas* sp. and *Nitrobacter* sp. that transform ammonia-ammonium into nitrites and finally into nitrates.

A secondary sedimentator (11) of the same characteristics as the primary sedimentator (8) is included in the circuit to ensure the quality of the water circulating in the system.

Pumps are also incorporated to meet the pumping requirements for each subsystem, including the aeration system.

Two mixing or chemical conditioning chambers (CMIX) are added.

A first chamber (12) receives the reject from the osmosis, i.e., the nutrient-rich stream coming from the RAS (1), and the following are added: a) a fertilizer based on potassium 18% $K_2O$, magnesium 3.0% MgO, sulfur 2.0% S; b) micronutrients (13) such as dissolved salts of Fe, Mg, Cu, Zn, Mo, B according to the specific deficit of the Hp-Loop system, without the addition of nitrogen ($NO_3$—) and phosphorus ($PO_4^{3}$—) whose presence is assessed by their contribution from the RAS; and c) saline solutions (20) to regulate the pH of the system such as solutions of $Ca(OH)_2$, KOH, $KHCO_3$ or citric acid for the Hp-loop. This first chamber (12) also receives discharge from the water coming from the primary sedimentator.

A second mixing chamber (6) receives the osmosis permeate, and the pH (21) suitable for the RAS is adjusted therein.

As additional equipment to the aquaponic system, the following is used:

- Ultrafiltration membranes (UF): Filtration membranes (22) are used to retain particles larger than 0.03 μm, specific to remove microorganisms and particles, including colloids, to protect the reverse osmosis filter.
- Polisher filter: The RO membrane must be protected to prolong its use. After the UF, the water passes through this filter, which contains stainless steel mesh cartridges that retain particles larger than 25 μm ensuring the membrane's lifespan.
- Degasser: $CO_2$ removal is carried out by a drip-type degassing column (14). It consists of equipment that presents several cylinders with internal sieves to disperse the circulating liquid from the RAS with the greatest possible turbulence, generating a raindrop effect by gravity, which allows increasing the contact surface between the liquid and natural air developing a $CO_2$ removal effect. This liquid (from the RAS) is raised to the degassing column (14) by an air-lift system (15), consisting of a hydraulic mechanism without pumps. By inflating air into the system coming from the blower (16) through a tube that is inside another one in contact with the RAS liquid (1), the bubbles rise generating a vacuum that manages to displace the liquid to the elevation of interest. $CO_2$ is produced by respiration that occurs in the fish tank (4) and also in the MBBR bioreactor (10) due to nitrifying bacteria that also produce $CO_2$.
- Water cooling equipment (chiller) (17): stabilizes the water temperature for the fish.
- Oxygenation equipment: a double equipment is used consisting of: 1) blowers, consisting of an air injection turbine (blowers) that distribute air to different points, as necessary in each of the subsystems, as well as for mechanical movement in the aerobic bioreactor (MBBR) (10), and air injection into the air-lift system (15); and 2) conical oxygenator (18) to dose $O_2$ online to supply possible minimum margins of oxygen demand in the total system.

Sludge removal is carried out without return to the system, meaning that no anaerobic mineralization loop is included for nutrient recovery in said sludge. In this way, the effect of the RO membrane on the concentration of salts reaching the Hp-loop (2) and dilution in the RAS (1) is evaluated exclusively. Such sludge comes from fish excrement and uneaten food.

The climatological data recorded daily during the 270-day duration of the experience were taken into account.

Start of sowing: for hydroponic cultivation, sowing is carried out using seedlings with leaf diameters between 3 and 8 cm from the apical view with root development to transplant to the DWC (Deep Water Culture) system, and for aquaculture cultivation, the fish have a total longitudinal size of between 10 and 12 cm to be planted in the tank containing them.

Water supply and pretreatment: tap water is stored in a sanitary tank. It is pumped to a sand filter to then pass through another activated carbon filter and then be incorporated into the RAS (1) subsystem in the corresponding mixing chamber (CMIX) (6).

Sanitization: Both subsystems, RAS (1) and Hp-loop (2), will undergo physical disinfection through ultraviolet radiation (UV) [(9)-(19)].

Greenhouse condition: the Hp-loop system (2) is located in a polyester film greenhouse with direct light transmission estimated at approximately 80%, and it has a shading system and a heat extraction and induction system by forced ventilation for the maintenance of hygrometric conditions (temperature, humidity, and ventilation).

Photoperiod requirements: both for the RAS (1) subsystem and the Hp-loop (2) subsystem, natural light requirements are obtained. Alternatively, artificial light is implemented, which is stipulated at 20 hours of light for the Hp-loop (2) and 12 hours of light for the RAS (1).

Temperature and water control: the RAS (1) subsystem has a temperature, conductivity, and pH sensor and translator online linked to a Programmable Logic Controller (PLC) coupled to a cooling equipment for maintaining the optimal temperature required by the rainbow trout (*Oncorhynchus mykiss* sp.) which is T (C)=15±0.3. The Hp-loop (2) subsystem has temperature, conductivity, and pH sensors online. For the cultivation of *Letuca sativa* sp. (lettuce), the average temperature of the recirculating water is maintained at T (C)=19±4, being controlled by the condition of the greenhouse and eventual recirculations of water input from the RAS (1) to the Hp-loop (2).

Automation and control of water currents: decoupling, permeation or RO filtration to the RAS, and concentrate or reject to the Hp-loop, including feeding the Hp-loop by the RAS, are carried out with electro-pneumatic valve actuators, which are linked to the same PLC (Programmable Logic Controller) that allows automation to operate the desalination process, including nutrient dosing.

Effluent from the system: effluent purges due to solids capture (sludge) by different sedimentation and filtration treatments are of the order of 4% of the total volume of the RAS; this sludge leaves the global aquaponic system. Effluents can be treated anaerobically by mineralization.

Figure 8:
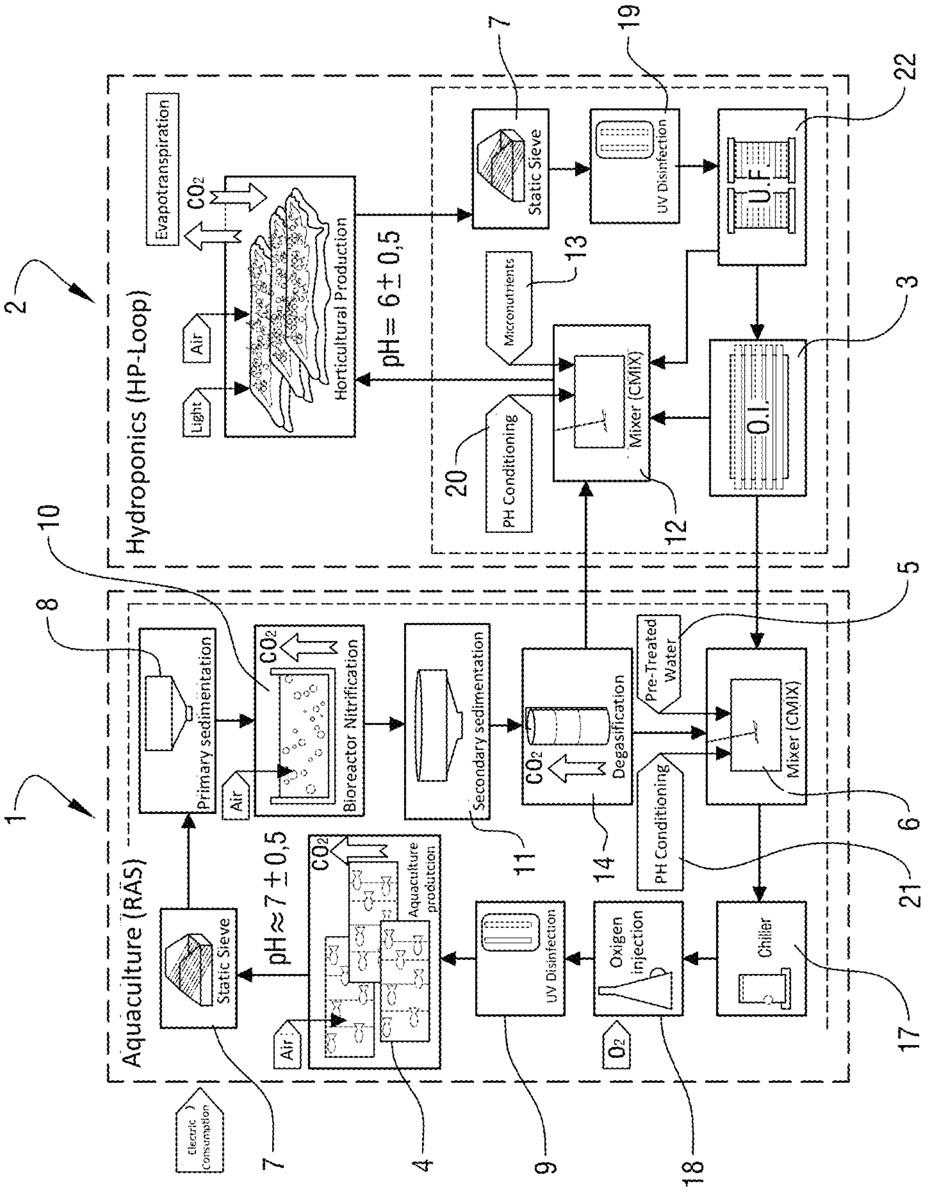
FIG. 8 shows the technological scheme of the decoupled aquaponic system by reverse osmosis with ultrafiltration pretreatment.
Figure 9:
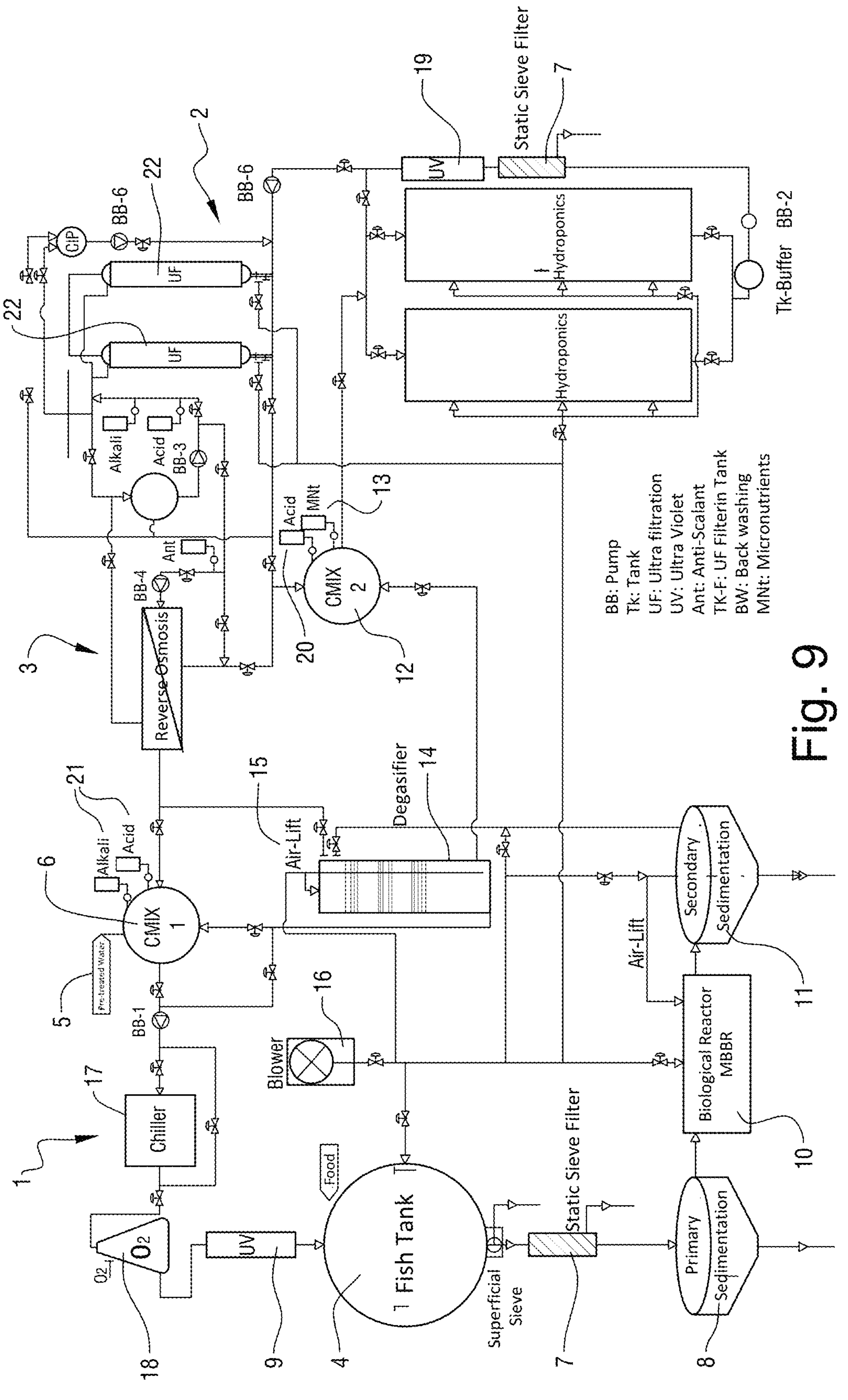
FIG. 9 shows the process diagram of the decoupled aquaponic system by reverse osmosis with ultrafiltration pretreatment.

The complete aquaponic system can be seen schematized in FIGS. 8 and 9.

Table 1 shows the system conditioning.

TABLE 1

General conditions for the production of decoupled aquaponic system.
Decoupled Aquaponic System through Reverse Osmosis Membrane Filtration

| Aspect | Value | Unit | Basis Calculation |
|---|---|---|---|
| Aquaponic Rate (RA) | 37 | $g/m^2 \cdot d$ | Range: 16-75 g Food/$m^2$ HSA · d |
| Hydroponic Surface Area (HSA) | 36 | $m^2$ | HSA = (S/R) × (N°R) |
| Feed (FP) | 1.3 | kg/d | FP = HSA × RA |
| Retained Biomass (Br) | 1.3 | % | Target fish species = Rainbow Trout |
| Total Fish Biomass (RbP) | 100 | $kg/m^3$ | RbP = FP/Br |
| Hydroponic Production lDeep Water Culture (DWC)l Hp-loop | | | |
| Number of basins (N°R) | 36 | Unit | |
| Number of Plants/Basins (N°P/R) | 36 | Unit | |
| Dimension of each basin (S/R) | 0.98 | $m^2$ | |
| Number of Total plants (TP) | 1296 | Unit | TP = (N°P/R × N°R) |
| Plant Density (Pd) | 36 | Unit/$m^2$ | Pd = TP/(N°R × S/R) |
| Aquaculture Production l Recirculating Aquaculture System l RAS | | | |
| Fish Tank Unit | 1 | Unit | |
| Aquaculture Tank Volume (WFs) | 1 | $m^3$ | |
| Maturation Time (Mt) | 9 | Month | |
| Initial Size /To (Lto) | 10 | cm | Average of the culture |
| Growth Rate (RG) | 2.5 | cm/month | Rainbow Trout - applied estimate: $RG = \frac{T(15^{\circ}\text{ C.}) - Tbase(0^{\circ}\text{ C.})}{TUbase(6, 12)}$ |
| Maximum Growth Length (L1) | 32 | cm | (L1) = Lto + (Mt × RG) |
| Conditional Growth Factor (K) | 1.11 | Natural Fish Factor | Rainbow Trout at 15° C. |
| Fish Density (Df) | 100 | $kg/m^3$ | Df = L1/C l (*C applied = 0.32) |
| Final Weight Gain per Fish (WGT1) | 0.37 | kg/Fish | $WGT1 = \frac{K \times (L1)^n}{100}$ (*n applied = 3) |

TABLE 1-continued

General conditions for the production of decoupled aquaponic system.
Decoupled Aquaponic System through Reverse Osmosis Membrane Filtration

| Aspect | Value | Unit | Basis Calculation |
|---|---|---|---|
| Number of Fish/Tank (N°FTk) | 274 | Unit | $N^\circ Tk = \frac{Df}{WGT1}$ |
| Total Fish (TF) | 274 | Unit | TF = N°Ftk × WFs |

TABLE 2

Details of the reverse osmosis membrane of the decoupled aquaponic system.

| Membrane Model | LFC3-LD4040 Hydranautics |
|---|---|
| Reverse Osmosis Flow | 1 $m^3$/h |
| Feed pressure | 0.81 MPa |
| Average Feed temperature | 15° C. |
| Feed Water pH agua | 5.8 pH |
| Specific Flux | 13.4 Liter/$m^2$ · hour(h) |
| Permeate Flow | 0.2 $m^3$/h |
| Feed Raw Water Flow | 1 $m^3$/h |
| Estimated Membrane Durability Age | 5 years |

The characteristic of this membrane is that it has low biofouling technology (undesirable biological encrustations of microorganisms, plants, and/or algae on wet structures) with an active membrane surface area of 7.43 $m^2$. It includes 2 RO membranes with an intermembrane separation of 0.864 mm.

For this purpose, the specified polishing filter is used prior to the UF (Ultrafiltration) system. The characteristics of this ultrafiltration membrane are expressed in Table 3.

TABLE 3

Conditions for the membrane used for ultrafiltration.

| UF membrane | SFD-2660 - Dow | |
|---|---|---|
| model | Feed | Permeate |
| UF flow | 1.3 $m^3$/h | 1 $m^3$/h |
| Reject Flow rate | — | 0.3 $m^3$/h |
| Suspended Solids SST | 15 mg/L | 2.3 mg/L |
| Total Organic Carbon TOC | 10 mg/L | 9 mg/L |
| Turbidity | 3.2 NTU | 0.1 NTU |
| Temperature | 19° C. | 19° C. |
| pH | 5.8 pH units | 5.8 pH units |

The control of permeate water, directed towards the RAS, and reject water, directed towards the HP-loop, is performed, with the following values found for pH, water hardness, and ion concentration. The values found can be seen in Table 4.

TABLE 4

Values found for the quality of permeate and reject water.

| Ion (mg/L) | Water Feed | Permeated water | Reject | Degassified permeate |
|---|---|---|---|---|
| Hardness ($CaCO_3$) | 572.9 | 1.3 | 715.8 | 10.084 |

TABLE 4-continued

Values found for the quality of permeate and reject water.

| Ion (mg/L) | Water Feed | Permeated water | Reject | Degassified permeate |
|---|---|---|---|---|
| $Ca^{2+}$ | 180 | 0.408 | 224.9 | 3.922 |
| $Mg^{2+}$ | 30 | 0.068 | 37.5 | 0.068 |
| $Na^+$ | 15 | 1.783 | 18.3 | 1.783 |
| $K^+$ | 156.4 | 21.102 | 190.2 | 21.102 |
| $NH_4^+$ | 23.4 | 3.342 | 28.2 | 3.342 |
| $Ba^{2+}$ | 0 | 0 | 0 | 0 |
| $Sr^{2+}$ | 0 | 0 | 0 | 0 |
| $Mn^{2+}$ | 82.35 | 0.019 | 102.9 | 0.02 |
| $Zn^{2+}$ | 2 | 0 | 2.5 | 0 |
| $Fe^{2+}$ | 3 | 0.001 | 3.7 | 0 |
| $H^+$ | 0 | 0.097 | 0 | 0.097 |
| $CO_3^{2-}$ | 0.02 | 0 | 0 | 0 |
| $HCO_{3-}$ | 350 | 5 | 436.2 | 5.005 |
| $SO_4^{2-}$ | 144 | 0.286 | 179.9 | 0.286 |
| $Cl^-$ | 5 | 0.04 | 6.2 | 0.04 |
| $F^-$ | 0 | 0 | 0 | 0 |
| $NO_{3-}$ | 770 | 45.733 | 950.9 | 45.733 |
| $PO_4^{3-}$ | 41 | 0.082 | 51.2 | 0.082 |
| $OH^-$ | 0 | 0 | 0 | 0 |
| $SiO_2$ | 0 | 0 | 0 | 0 |
| B | 0.5 | 0.5 | 0.5 | 0 |
| $CO_2$ | 894.71 | 894.71 | 894.71 | 5 |
| $NH_3$ | 0 | 0 | 0 | 0 |
| TDS | 1802.67 | 78.37 | 2233.38 | 81.88 |
| pH | 5.8 | 4.01 | 5.89 | 7.36 |

Figure 10:
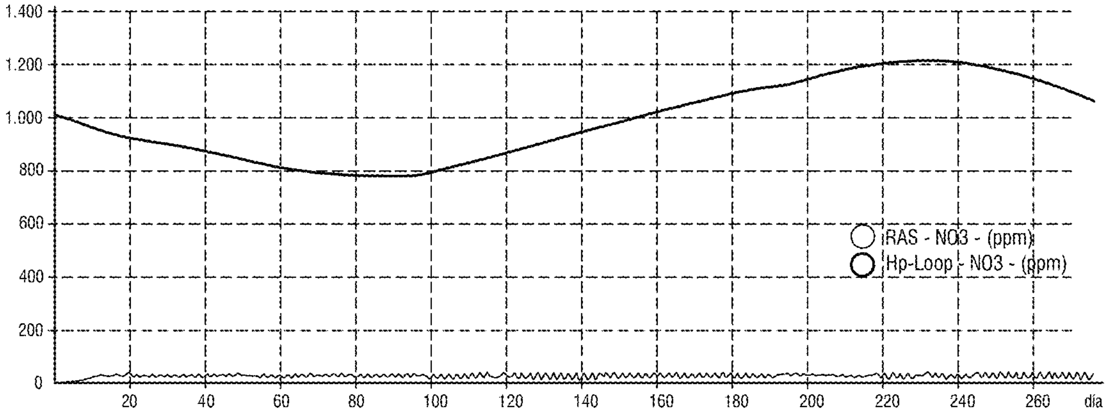
FIG. 10 shows the behavior of nitrate concentrations ($NO_3$—) applying reverse osmosis treatment in the production cycle for RAS subsystem reservoirs and Hp-loop.
Figure 11:
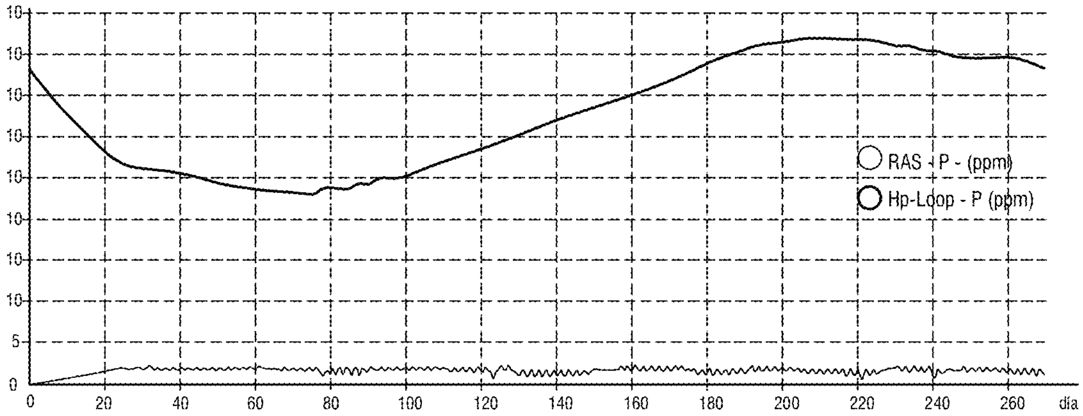
FIG. 11 shows the behavior of phosphate concentrations ($PO_4^{3}$—) applying reverse osmosis treatment in the production cycle for RAS subsystem reservoirs and Hp-loop.
Figure 12:
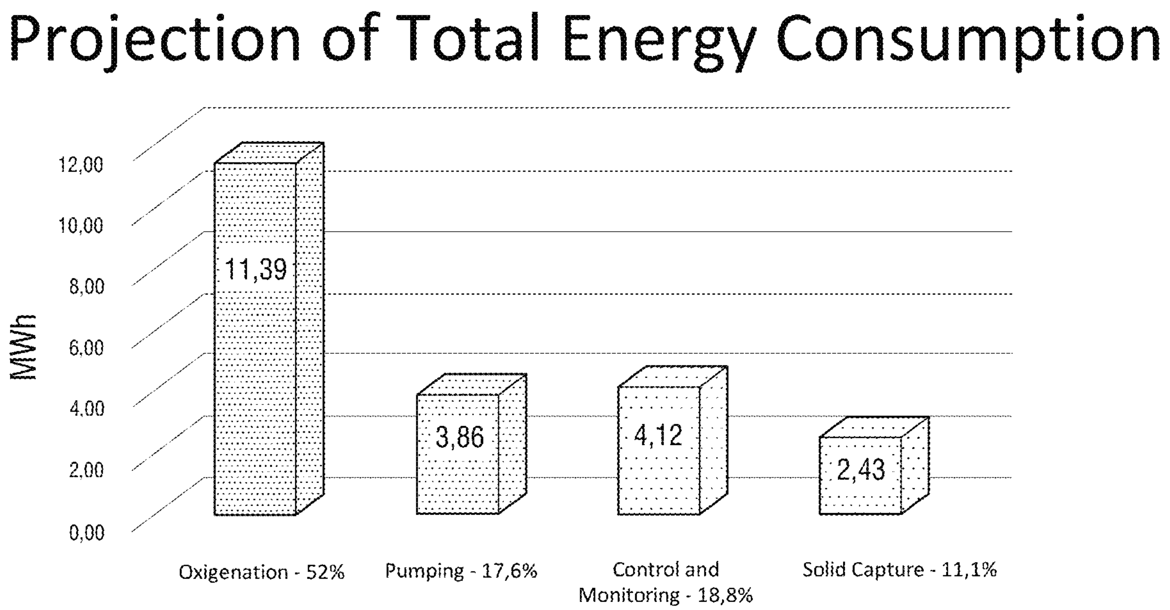
FIG. 12 shows the total energy consumption (KW) of the decoupled aquaponic system by RO for the production of rainbow trout and lettuce in a 270-day production cycle.

In FIGS. 10 and 11, the results obtained in the measurement of nitrates and phosphates respectively can be seen, both in the RAS and in the Hp-loop. The control of these parameters is of fundamental importance since these compounds, obtained from the waste of the aquaculture system and transformed in the MBBR (reactor) by suitable aerobic bacteria such as *Nitrosomonas* and *Nitrobacter*, constitute the essential nutrients of the hydroponic system. Both compounds, nitrates and phosphates, are found in greater quantities in the Hp-loop than in the RAS, confirming the efficiency of the system.

Among the advantages provided by this membrane technology by RO, it should be mentioned that it maximizes water recovery in the permeate and the higher rejection of salts, thus increasing the amount of nutrients in the Hp-loop and the quality of the permeate water in the RAS. This arises from the values found in Table 4.

Another advantage is that, compared to other experiences of decoupled aquaponic systems, it shows lower energy consumption, as observed in Table 5.

TABLE 5

Comparison of the energy expenditure of decoupled aquaponic systems between that carried out by thermal distillation and that incorporating reverse osmosis membrane filtration (RO).

| Component consumption | Aquaponics with Thermal Distillation: Magnitude | Aquaponics with Thermal Distillation: Flexibility | Aquaponics with Reverse Osmosis: Magnitude | Aquaponics with Reverse Osmosis: Comment |
|---|---|---|---|---|
| RAS (pumping) | 0.05-0.15 $kW_e/m^3$<br>1-3 $kW_e$<br>8.76-28.26 $MWh_e$/year | Not all pumps need to operate continuously.<br>Main processes (oxygen control, ammonia control, CO2 control, tank exchange, suspended solids control) must run continuously. Smaller processes such as pH buffer dosing backwash routines, water exchanges, or backup oxygenation do not need to run continuously. | Similar values in only RAS<br>21.79 MWh/year | Including reverse osmosis pumping |
| Light | 80-150 $W/m^2$<br>With a capacity factor of 10-20% - consumes:<br>28-105 $MWh_e$/year | Plants need 4-6 h of darkness, the rest of the day can be artificially lit. Approx. 0 in summer to additional 12 h in winter (flexible lighting) | Similar values if LED light is used in the hydroponic system | |
| Space and Aquaculture Tank Heating | 444 $kW_{th}/m^2$/year<br>177.8 MWh/year | Due to the high thermal mass of the concrete floor and the large volume of water in the RAS tank, the heat load is extremely flexible | Similar values if heating is required for RAS water | |
| Distillation Unit | 50 $kW_{th}$<br>166.4 $MWh_{th}$/year | The distillation unit operates with hot water (70-90° C.) and can be operated with a significant degree of flexibility (MemSys, 2017) | Does not require this energy consumption | |
| Totalización | 380.96-477.46 MWh/year* | | 227.59-304.6 MWh/year | |

*Goddek S., Joyce A., Kotzen B., Burnell G. M., (2019). Aquaponics food production systems: combined aquaculture and hydroponic production technologies for the future (p. 389). Springer Nature.

In the totalization of the energy consumption of the decoupled aquaponic system with thermal distillation treatment, it can be seen (Table 5) that the scope in which it operates is significantly higher than that corresponding to the treatment including OI membrane. While in the former, the variation is in the range of 380.96-477.46 MWh/year, in the latter, which corresponds to the present invention, it is 227.59-304.6 MWh/year.

With the implementation of the 3-loop (OI), satisfactory production is found for both subsystems as the recovery of permeate water (Table 4) returning to the RAS subsystem is maximized, and the reverse osmosis process increases the nutrient quantity in the Hp-loop subsystem.

Membrane technologies such as OI and UF have achieved synergies and complementary compatibilities, adapting to the demanding requirements of quality and quantity of recirculated water in the RAS, and demonstrating adaptability with DWC technology. They achieve benefits in volume buffering against peaks and valleys, eliminating the risk for the crop due to deficit or excess.

The invention claimed is:

1. A decoupled aquaponic system characterized in that it comprises:
- a recirculating aquaculture subsystem (RAS loop) consisting of a fish tank unit;
- a hydroponic subsystem (Hp-loop) and
- a third loop (OI) that performs reverse osmosis membrane filtration treatment (OI) connecting both subsystems,
- wherein the fish are freshwater fish and the plants are vegetables, fruits, cole crops, inflorescence, bulbs, stems, ornamentals, or forage crops susceptible to be grown hydroponically,
  - wherein the recirculating aquaculture subsystem (RAS loop) and the hydroponic subsystem (Hp-loop) are linked by means of the third loop (OI), both subsystems being in fluid communication with the OI membrane that distributes the salt-rich solution (reject) containing N and P to the Hp-loop and the desalinated water (permeate) back to the RAS.

2. The decoupled aquaponic system of claim 1, characterized in that it receives water from the network in a sanitary cistern to which pretreatment is performed by pumping it to a sand filter and then through an activated carbon filter, wherein the thus filtered water is then incorporated into the mixing chamber (CMIX) corresponding to the RAS subsystem as required.

3. The decoupled aquaponic system of claim 1, characterized in that it has an oxygenation system that distributes and doses oxygen to different points of the system and an aeration system (blower) consisting of an air injection turbine.

4. The decoupled aquaponic system of claim 1, characterized in that the recirculating aquaculture subsystem RAS and the hydroponic subsystem Hp-loop both have a physical disinfection equipment by ultraviolet radiation (UV) with a capacity of 30 mJ/cm$^2$ to sanitize both subsystems.

5. The decoupled aquaponic system of claim 1, characterized in that the recirculating aquaculture subsystem RAS contains the species *Oncorhynchus mykiss* sp. (rainbow trout), with optimal water temperature for cultivation achieved through a temperature control system of T (° C.)=15±0.3 and optimal pH between 6.5 and 7.5, preferably 7.0, and where the incorporated fish have an initial size (To) of 10 cm.

6. The decoupled aquaponic system of claim 5, characterized in that the recirculating aquaculture subsystem RAS can also be applied to any freshwater aquaculture species that support the fish density without suffering from population stress, such as carp and its varieties, tilapia and its varieties, *pacu* and its varieties, catfish and its varieties, and freshwater shrimp.

7. The decoupled aquaponic system of claim 5, characterized in that the recirculating aquaculture subsystem RAS is carried out in a single tank of 1 m$^3$ volume, with the number of tanks being increased according to production requirements.

8. The decoupled aquaponic system of claim 7, characterized in that the aquaculture tanks are constructed of selected materials including geomembrane, cement, plastic, and combinations thereof.

9. The decoupled aquaponic system of claim 5, characterized in that the recirculation subsystem RAS undergoes degassing of $CO_2$ produced by the respiration of the fish and by the nitrifying bacteria of the aerobic MBBR (Moved Bed Bio-Reactor) type.

10. The decoupled aquaponic system of claim 9, characterized in that the degassing equipment consists of a water droplet degassing system.

11. The decoupled aquaponic system of claim 5, characterized in that the recirculating aquaculture subsystem RAS features sensors and translators for temperature, conductivity, and pH linked to a PLC (Programmable Logic Controller), and is coupled with a chilling unit (chiller) to stabilize the optimal temperature for the fish.

12. The decoupled aquaponic system of claim 5, characterized in that the recirculating aquaculture subsystem RAS has a mixing or chemical conditioning chamber receiving permeate water from the reverse osmosis of the 3-loop (OI) and pretreated water as required by the subsystem, where the pH suitable for RAS is adjusted.

13. The decoupled aquaponic system of claim 5, characterized in that the recirculating aquaculture subsystem RAS anticipates natural light requirements and implements artificial light, if necessary, estimated at 12 hours of daily light.

14. The decoupled aquaponic system of claim 5, characterized in that the RAS subsystem features a filter and a sedimentation tank through which the system water recirculates.

15. The decoupled aquaponic system of claim 5, characterized in that the RAS subsystem removes sludge from fish excrements and unconsumed feed without returning it to the system for nutrient recovery treatment, exclusively to evaluate the effect of the OI membrane on the salt concentration reaching the Hp-loop and dilution in the RAS.

16. The decoupled aquaponic system of claim 1, characterized in that the hydroponic subsystem (Hp-loop) consists of a plurality of deep water culture (DWC) floating raft units where plants are suspended in beds (floating rafts) with their roots stretching downward submerged in an aerated nutrient-rich water tank, wherein said hydroponic subsystem (Hp-loop) comprises 36 rafts (beds) each with a surface area of 0.98 m$^2$, with 36 plants/raft, located in a polyester film greenhouse with estimated direct light transmission of 80%, and equipped with shading mesh.

17. The decoupled aquaponic system of claim 16, characterized in that each floating raft is made of wood protected by a bi-layer impermeable geotextile blanket.

18. The decoupled aquaponic system of claim 16, characterized in that the hydroponic subsystem (Hp-loop) comprises the species *Lactuca sativa* sp. (lettuce) with optimal water temperature for cultivation T (° C.)=19±4 and optimal pH ranging from 5.5 to 6.5, preferably 6.0.

19. The decoupled aquaponic system of claim 16, characterized in that the hydroponic subsystem (Hp-loop) features sensors and translators for temperature, conductivity, and pH linked to a PLC (Programmable Logic Controller), where temperature adjustment depends on greenhouse conditions and potential water inflow recirculation from the RAS (1).

20. The decoupled aquaponic system of claim 16, characterized in that the hydroponic subsystem (Hp-loop) can be applied to any leafy crop suitable for DWC (Deep Water Culture) systems, such as arugula, basil, Swiss chard, cabbage, broccoli, spinach, celery, and oregano.

21. The decoupled aquaponic system of claim 16, characterized in that the hydroponic subsystem (Hp-loop) anticipates natural light requirements and implements artificial light, if required, estimated at 20 hours of daily light.

22. The decoupled aquaponic system of claim 16, characterized in that the hydroponic subsystem (Hp-loop) features a second mixing or chemical conditioning chamber (CMIX) receiving nutrient-rich stream from the RAS, to which: a) a potassium-based fertilizer with 18% $K_2O$, 3.0% magnesium as MgO, and 2.0% sulfur as S is added; b) micronutrients such as dissolved salts of Fe, Mg, Cu, Zn, Mo, B according to specific Hp-loop subsystem deficits, and c) saline solutions for regulating the subsystem pH such as solutions of $Ca(OH)_2$, KOH, $KHCO_3$, or citric acid.

23. The decoupled aquaponic system of claim 1, characterized in that the 3-loop (OI) subsystem consists of reverse osmosis membrane (OI) units each receiving a flow rate of 1 m$^3$/h, where said membrane features low biofouling technology with intermembrane separation of 0.864 mm and active membrane surface area of 7.43 m2, with an average lifespan of 5 years.

24. The decoupled aquaponic system of claim 23, characterized in that the water entering the membranes (OI) has a temperature T=19° C. and a pH=5.8.

25. The decoupled aquaponic system of claim 23, characterized in that the 3-loop (OI) subsystem comprises a water ultrafiltration (UF) system placed at its inlet to ensure membrane protection.

26. The decoupled aquaponic system of claim 25, characterized in that the UF system contains stainless steel mesh cartridges retaining particles larger than 25 μm, thus extending the lifespan of the membrane.

27. The decoupled aquaponic system of claim 23, characterized in that the reverse osmosis membrane (OI) filtration treatment separates two solutions with different concentrations, one concentrated in salts, especially nitrates and phosphates, directed to the Hp-loop (called reject), and another demineralized one returning to the RAS (called permeate).

28. The decoupled aquaponic system of claim 27, characterized in that both separated streams at the OI membrane reenter the subsystems by adapting appropriate pH and temperature control conditions for each of them through the PLC (Programmable Logic Controller).

* * * * *